TELEPHONE SIGNALING ARRANGEMENT

Filed Sept. 14, 1965

INVENTOR
L. L. BLANE
BY M J Rackman
ATTORNEY 3,436,487

TELEPHONE SIGNALING ARRANGEMENT

Leslie L. Blane, Rumson, N.J., assignor to Bell Telephone Laboratories, Incorporated, New York, N.Y., a corporation of New York Filed Sept. 14, 1965, Ser. No. 487,114
Int. Cl. H04m *1/26, 3/00*
U.S. Cl. 179—84 18 Claims

ABSTRACT OF THE DISCLOSURE

A telephone signaling arrangement is disclosed comprising a pair of telephone circuits and a pair of signaling equipment means for transmitting and receiving signals in the voice frequency band simultaneously with speech and over the same transmission channel as speech. When signaling is in progress, broad band rejection filters are connected between the transmission channel and each of the telephone circuits for rejecting all voice signals in the signaling frequency band, and broad band pass filters are connected between the transmission channel and each of the signaling equipment means for passing only signals of signaling frequencies. When no signaling is taking place, the broad band rejection filters are replaced by narrow band rejection filters to allow the passage of more speech signals, and the broad band pass filters are replaced by narrow band pass filters for passing only a subset of the signaling frequencies.

This invention relates to communication systems and more particularly to telephone circuit and signaling equipment combinations.

There are many prior art systems in which a telephone line is used for signaling purposes as well as for the transmission of voice signals. In a typical system a pair of telephone circuit may be connected to the two ends of the line and a pair of signaling circuits may be similarly connected. The signaling, which may represent supervisory or any other type of information, may comprise signals of two different frequencies. Suppose, for example, that binary 0's and 1's are represented by the two frequencies 1940 c.p.s. and 2010 c.p.s. The problem encountered when transmitting both voice and signaling frequencies over the same line is that the signaling frequencies may be heard as tones in the telephone circuits and voice frequencies of 1940 and 2010 c.p.s. may be interpreted by the signaling equipments as received data.

To overcome this problem band rejection filters have been used in the prior art. Each of the filters passes through it signals of all frequencies except the signaling frequencies of 1940 c.p.s. and 2010 c.p.s. and those frequencies between and adjacent to these signaling frequencies. Each filter is connected between one of the telephone circuits and the line. The signaling equipments are connected directly to the line. Each band rejection filter removes the 1940 and 2010 c.p.s. components in the voice signal transmitted by the respective telephone circuit. Consequently, any 1940 and 2010 c.p.s. signals on the line can arise only from the operation of the signaling equipments. If such signals are received by one of the signaling equipments, they can have originated only from the signaling equipment at the other end. The band rejection filters also prevent the signaling frequencies from being extended to the telephone circuits. Because the band rejection filters do not pass the signaling frequencies from the line to the telephone circuits the signaling tones are not heard by parties engaged in a conversation.

In order to reject the 1940 and 2010 c.p.s. signals, which are separated by only 70 c.p.s., it is necessary to reject all frequencies in a relatively wideband. This is due to the fact that if the signaling shifts between the 1940 and 2010 c.p.s. signals at the rate of 75 times per second, for example, a sideband spectrum is developed requiring three times the frequency shift. In addition, practical filters have sloping side characteristics. Thus the effective rejected band may be 250 c.p.s. wide. The two band rejection filters are centered about 1975 c.p.s. and reject a band of approximately 125 c.p.s. on either side of the center frequency. While the signaling frequencies are thus attenuated, a considerable portion of the voice signal information is also rejected. Thus, in the prior art in order to transmit signaling frequencies along with a voice signal a portion of the voice signal is lost. Because the band rejection filters are included in the line at all times, some of the voice signal information is rejected even in the absence of signaling. The filters are included in the system even in the absence of signaling because without them each of the signaling equipments would have no way of knowing when signaling from the other end is initiated. If the filters are omitted from the line and the complete voice signal is transmitted from the telephone circuit at one end of the line, the signaling equipment at the other end might erroneously respond to the 1940 and 2010 c.p.s. components in the voice signal. By leaving the filters in the system even in the absence of signaling, the signaling equipments do not respond erroneously to the voice signal. When one of the signaling frequencies is received by a signaling equipment, it can only have come from the signaling equipment at the other end.

It is a general object of this invention to improve the transmission characteristics of a combined voice-signaling channel during those intervals when the channel is not being used for the transmission of signaling information.

In one illustrative embodiment of the invention, during those periods when the channel is being used only for the transmission of voice signals, two narrowband rejection filters are substituted for the two wider band rejection filters used in the prior art. These two narrowband rejection filters are centered about 1940 c.p.s. To filter out the 1940 c.p.s. component from the voice signal, the filters must reject other frequencies from either side of the center frequency because of the frequency shift of telephone lines and because ordinary filters are not ideal. However, because the 2010 c.p.s. component of the voice signal is no longer filtered out and since there is no signaling shift between the 1940 and 2010 signals, the frequency band which is rejected is much narrower than 250 c.p.s., e.g., only 50 c.p.s. While the two narrowband rejection filters are included in the line, the signaling equipments are prevented from transmitting and receiving 2010 c.p.s. signals and consequently the voice signal on the line may include a component of 2010 c.p.s. and components of the adjacent frequencies. When signaling is to begin one of the signaling equipments applies a 1940 c.p.s. tone to the line. This tone is not extended to the telephone circuit at the other end because it is filtered out by the associated narrowband rejection filter. However, the signaling equipment at the other end detects the signal and is notified that signaling is to begin. The signaling equipments at both ends of the system control the removal of the narrowband rejection filters from the line and the substitution of the wider band rejection filters. At the same time the signaling equipments are enabled to transmit and receive 2010 c.p.s. signals as well as 1940 c.p.s. After the filters are switched the system functions in the ordinary manner.

The signaling equipments include mechanisms which respond to the absence of 1940 and 2010 c.p.s. signals on the line for a predetermined time interval, e.g., 100 milliseconds. If the signaling frequencies are not detected for this time interval, the two signaling equipments are made aware that the signaling has stopped. They then control the removal of the wider band rejection filters from the line and the substitution of the two narrowband filters. At the same time the signaling equipment are made insensitive to 2010 c.p.s. signals on the line. Thus, while a 250 c.p.s. band of frequencies in the voice signal is still rejected while signaling takes place, in the absence of signaling only a 50 c.p.s. band of frequencies is rejected. During those intervals when the channel is used only for voice communication the transmission characteristics are vastly improved.

It is a feature of this invention to substitute narrowband rejection filters for the wider band rejection filters at both ends of a combined telephone-signaling channel during those periods when signaling does not take place.

It is a further feature of this invention to enable the signaling equipments at either end of the channel to respond to less than all of the signaling frequencies while the narrowband rejection filters are substituted for the wider band rejection filters.

It is a further feature of this invention to include in the signaling equipments mechanism for detecting signals of the frequency or frequencies to which the signaling equipments can respond while the narrowband rejection filters are included in the channel, and upon the detection of such a signal to control the reinsertion of the wider band rejection filters in the channel and to control the signaling equipments to once again operate on all signaling frequencies.

It is a further feature of this invention to reinsert the narrowband rejection filters in the channel in place of the wider band rejection filters and to prevent the signaling equipments from responding to all of the signaling frequencies when no signaling frequency has appeared on the channel for a predetermined time interval.

Further objects, features and advantages of the invention will become apparent upon consideration of the following detailed description in conjunction with the drawing, in which.

Figure 1:
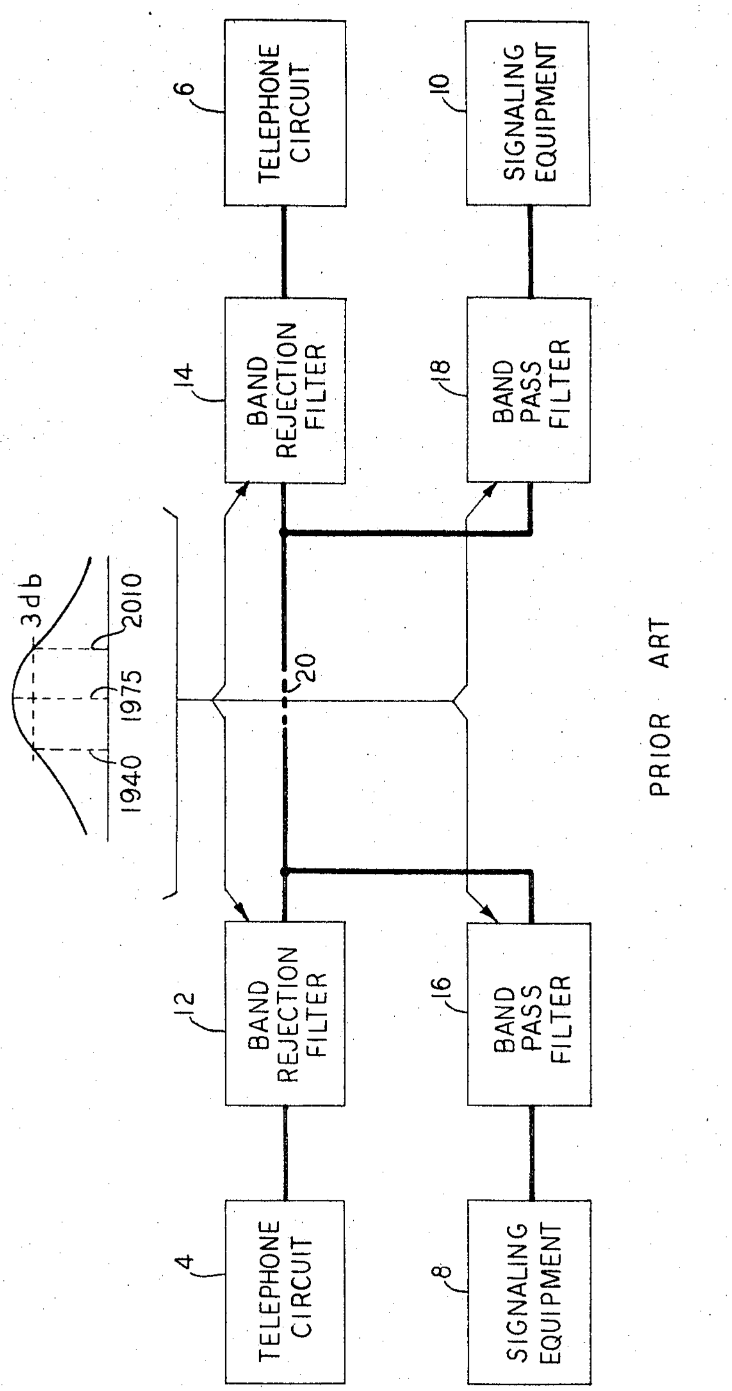
FIG. 1 depicts the prior art type of voice-signaling communication system.

Referring to FIG. 1 channel 20 (represented by a single conductor although in most practical systems comprising two or more conductors) connects the two ends of the system. The two telephone circuits 4 and 6 communicate with each other as do the two signaling equipments 8 and 10. FIG. 1 may be considered to be a complete "2-wire" system, or like FIG. 2 one half of a "4-wire" system. In the former case both telephone circuits and both signaling equipments transmit signals over channel 20 and the channel is used for transmission in both directions. In the latter case the channel is used for transmission in only one direction, e.g., from left to right, and a second channel is provided for transmission from right to left. Thus, if the system shown in FIG. 1 is considered as one half of a "4-wire" system (in which a unidirectional "2-wire" system is provided for transmission in each direction), telephone circuit 4 transmits voice signals over channel 20 to telephone circuit 6 which receives them, and signaling equipment 8 transmits signaling frequencies to signaling equipment 10 which detects them. Throughout the remainder of this description FIG. 1 will be considered to be part of a 4-wire system. The application of the principles of the invention to a 2-wire system will be apparent to those skilled in the art.

The four filters 12, 14, 16 and 18 connect the respective telephone circuits and signaling equipments to the channel. While filters 12 and 14 are of the band rejection type and filters 16 and 18 are of the band pass type, all four filters are defined by the same characteristic as shown in the drawing.

The two band rejection filters pass signals of all frequencies except 1975 c.p.s. and those within a selected band on either side of 1975 c.p.s. The greatest attenuation is of 1975 c.p.s. signals with the 3 db points being at 1940 and 2010 c.p.s. The 1940 and 2010 c.p.s. voice signals are attenuated sufficiently such that any remanents of these signals on the channel are incapable of operating a signaling equipment. In order to attenuate the 1940 and 2010 c.p.s. signals with ordinary filters it is also necessary to attenuate the signals on either side of these two frequencies. The use of such band rejection filters effectively rejects a band of frequencies approximately 250 c.p.s. wide centered about 1975 c.p.s. The two band pass filters operate in exactly the converse manner. These filters allow no signals to pass through them except those in the same 250 c.p.s. band. The 1940 and 2010 c.p.s. signals which pass through filters 16 and 18 are the two which operate the signaling equipments.

Signals of 1940 and 2010 c.p.s. are used for signaling purposes. These signals may represent, for example, binary 0's and 1's. The signals are sent from left to right. Because band rejection filter 12 is included in the channel, 1940 and 2010 c.p.s. signals on the channel can arise only from the operation signaling equipment 8. These signals are transmitted through the band pass filters between the signaling equipments. Two band rejection filters are required. Voice signals originate in telephone circuit 4 and the signaling originates in signaling equipment 8. Filter 12 is required in order that 1940 and 2010 c.p.s. components in the voice signal not appear on the channel; otherwise signaling equipment 10 would respond erroneously. Filter 14 is required in order that the two signaling frequencies applied to the channel by equipment 8 not be received by telephone circuit 6. Were filter 14 omitted, the two signaling frequencies would be heard as tones by a party using telephone circuit 6.

The two band rejection filters effectively remove a 250 c.p.s. band of frequencies from the voice signal transmitted in either direction. While the channel is being used for both voice communication and signaling, the reduction in the intelligibility of the voice transmittion is at least justified by the double purpose for which the channel is used. But when the channel is not used for signaling purposes the rejection of a 250 c.p.s. band in the voice signal would appear to be unjustified since the channel is being used only for voice communication. Nevertheless, the two band rejection filters are kept in the channel in prior art circuits for the following reason: without filter 12 signaling equipment 10 would respond erroneously to the voice signals. If band rejection filter 12 is taken out of the channel, signaling equipment 10 would respond erroneously to the 1940 and 2010 c.p.s. components of the voice signal transmitted from telephone circuit 4 to the channel. Similarly, filter 14 is required in order that tones from signaling equipment 8 not be allowed to enter telephone circuit 6 when signaling resumes.

Figure 2:
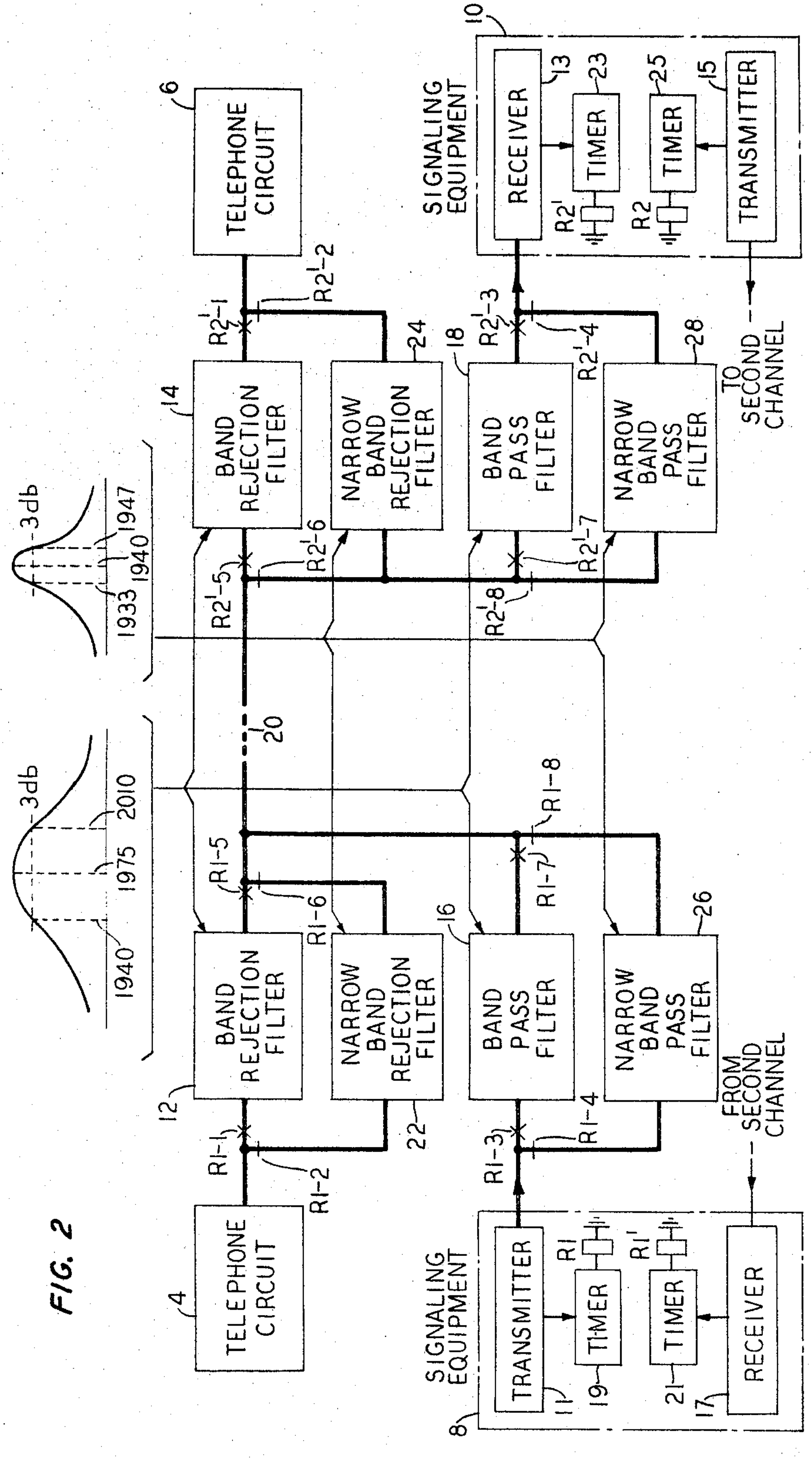
FIG. 2 depicts an illustrative embodiment of my invention.

The system of FIG. 2 includes all of the elements in the prior art system. Again, only one channel is shown in detail. (In FIG. 2 because the signaling equipments are shown in greater detail, the connections to the second channel, for right-to-left transmission, are indicated.) The two narrowhead rejection filters 22 and 24 and the two narrowband pass filters 26 and 28 are added to the channel, each of which is connected in parallel across a respective one of the four filters in the prior art system. The signaling equipments now include respective relays R1 and R1', and R2 and R2'. Each relay controls eight contacts at its end of the system. (Relays R1' and R2 control contacts in the other channel, not shown, and operate similar to relays R2' and R1.) The signaling equipments further include timing circuits. These circuits as well as the various transmitters and receivers will be apparent to those skilled in the art and for this reason are not shown in detail in the drawing.

Filters 12, 14, 16, and 18 are identical to the samenumbered respective filters in FIG. 1 and are defined by the same characteristic. The additional filters 22, 24, 26, and 28 are defined by a narrower characteristic. This characteristic is centered at 1940 c.p.s. with the 3 db points being at 1933 and 1947 c.p.s. The effective width of this second characteristic is approximately 50 c.p.s. rather than 250 c.p.s. Narrowband pass filters 26 and 28 pass through them only the frequencies in this 50 c.p.s. band; narrowband rejection filters 22 and 24 pass through them all frequencies except those in this 50 c.p.s. band.

The system of FIG. 2 includes two independent subsystems, of which only one is shown completely in the drawing. Transmitter 11 transmits signaling frequencies over channel 20 to receiver 13. In accordance with the signals transmitted timer 19 controls the operation of relay R1, which in turn controls the switching of various filters in channel 20 at the left end of the system. In accordance with the received signals timer 23 controls the operation of relay R2', which in turn controls the switching of various filters in channel 20 at the right end of the system. Transmitter 15, timer 25, relay R2, receiver 17, timer 21 and relay R1' are connected to the channel used for transmission in the other direction, the eight filters connected in this channel not being shown in the drawing. The right-to-left subsystem is identical to the left-to-right subsystem and for this reason is not shown completely. Although the following description relates only to the latter subsystem the operation of the former is similar.

When channel 20 is being used for both voice communication and signaling purposes both of relays R1 and R2' are operated. Consequently, in this state of the system all of the make contacts on FIG. 2 are closed and all of the break contacts are open. The filters which are included in the various transmission paths are filters 12, 14, 16, and 18—the same ones to be found in FIG. 1. Consequently, when the channel is being used in a double capacity the system of FIG. 2 reduces to that of FIG. 1 as required. Band rejection filter 12 prevents the two signaling frequencies from being applied to the channel by telephone circuit 4, and band rejection filter 14 prevents the two signaling frequencies applied to the channel by signaling equipment 8 from being directed to telephone circuit 6. The two band pass filters 16 and 18 improve the reliability of the signaling equipments by preventing the transmission or receipt of all frequencies except those in the signaling band.

Each of signaling equipments 8 and 10 includes a timer mechanism which controls the operation of relay R1 or R2' respectively when signal transmission from signaling equipment 8 to signaling equipment 10 begins. With relays R1 and R2' operated, the four previously used filters are removed from the system and filters 12, 14, 16 and 18 are substituted for them. If the signaling ceases for 100 milliseconds, the timers release the relays. With relays R1 and R2' released, filters 22, 24, 26 and 28 are restored in the channel.

In the absence of signaling, with narrowband rejection filters 22 and 24 inserted in the system rather than the wider band rejection filters 12 and 14, the only frequencies filtered out of the voice signal are those centered about 1940 c.p.s. The effective bandwidth of the rejected signals is approximately 50 c.p.s. The 2010 c.p.s. component of the voice signal, for example, appears on the channel. With narrowband pass filters 26 and 28 included in the system rather than band pass filters 16 and 18, the only signal frequencies which can be passed from signaling equipment 8 to signaling equipment 10 are those centered about 1940 c.p.s., i.e., those which are not applied to the channel by telephone circuit 4 since they are rejected by filter 22. Consequently, in the absence of signaling, signaling equipment 10 does not operate erroneously. Narrowband pass filter 28 is necessary for the proper operation when the channel is being used only for transmitting voice signals. Since narrowband rejection filter 22 does not reject 2010 c.p.s. signal components, voice signals of this frequency can appear on the channel. Since signaling equipment 10 can respond to signals of this frequency the narrowband pass filter is required to filter out this frequency.

When signaling from left to right is to resume, this determination being made by signaling equipment 8, a 1940 c.p.s. signal is transmitted. The 1940 c.p.s. signal transmitted by the signaling equipment passes through narrowband pass filter 26 to the channel, and through narrowband pass filter 28 to signaling equipment 10. The transmission of the signal by signaling equipment 8 directly causes the operation of timer 19 and relay R1. The detection of the signal by receiver 13 in signaling equipment 10 results in the operations of timer 23 and relay R2'. With the two relays operated the system reduces to that shown in FIG. 1. With the two wider band pass filters 16 and 18 included in the system, 2010 c.p.s. signals may be transmitted from signalling equipment 8 to signaling equipment 10 as well as 1940 c.p.s. signals. With the two wider band rejection filters 12 and 14 included in the system instead of narrowband rejection filters 22 and 24, 2010 c.p.s. signals are filtered from the voice signal as well as 1940 c.p.s. signals. Signaling then takes place along with the voice communication. The two timers 19 and 23 release when no signals are detected by them for 100 milliseconds. As long as signaling continues transmitter 11 retriggers timer 19 at least once every 100 milliseconds and relay R1 remains operated. Similar remarks apply to receiver 13, timer 23 and relay R2'. At the end of signaling from equipment 8, timers 19 and 23 release relays R1 and R2' after 100 milliseconds have elapsed. At this time the narrowband filters once again function instead of the wider band filters.

Thus, it is seen that when the channel is used in a double capacity, a 250 c.p.s. frequency band is still filtered out of the voice signal, as in the prior art. But in the absence of signaling only a 50 c.p.s. band is filtered out of the voice signal. Components of the voice signal centered about 2010 c.p.s. are not rejected. In order for the signaling equipments to be able to determine when signaling is to resume, it is only necessary that 2010 c.p.s. signals have no effect on the signaling equipments once they are taken out of operation. This can be achieved with the use of narrowband pass filters. When a channel is being used only for voice communication the receiving signaling equipment can respond only to 1940 c.p.s. signals, and if such a signal is detected, the signaling equipment receiving it is made aware that the other signaling equipment is resuming operation.

Although the invention has been described with reference to a particular embodiment, it is to be understood that this embodiment is only illustrative of the application of the principles of the invention. For example, transistor circuits may be used instead of relays. Also, more than two signaling frequencies may be used; in such a case in the absence of signaling fewer than all of the signaling frequencies are filtered out of the voice signal and the signaling equipments are made to respond to only the filtered out frequency or frequencies. Thus, numerous modifications may be made in the illustrative embodiment of the invention and other arrangements may be devised without departing from the spirit and scope of the invention.

What is claimed is:

1. A combined telephone-signaling system comprising a communication channel, a pair of telephone circuits, a pair of signaling equipment means for respectively transmitting and receiving signals of first and second predetermined frequencies, a first pair of band rejection filters each normally connected between a respective one of said telephone circuits and said channel for filtering out signals of said first frequency, a first pair of band pass filters each normally connected between one of said signaling equipment means and said channel for passing only signals centered about said first frequency, a second pair of band rejection filters for filtering out signals of both of said first and second frequencies, a second pair of band pass filters for passing signals of both of said first and second frequencies, and control means responsive to the transmission of a signal of said first frequency by said transmitting signaling equipment means and the detection of said signal by said receiving signaling equipment means for disconnecting said first pair of band rejection and said first pair of band pass filters from said channel and connecting in their sted respective ones of said second pair of band rejection and said second pair of band pass filters.

2. A combined telephone-signaling system in accordance with claim 1 wherein said control means is further responsive to the absence of signals of said first and second frequencies on said channel for a predetermined time interval for disconnecting said second pair of band rejection and said second pair of band pass filters from said channel and connecting in their stead the respective ones of said first pair of band rejection and said first pair of band pass filters.

3. A combined telephone-signaling system comprising a communication channel; a pair of telephone circuits; a pair of signaling equipment means connected to said channel for respectively transmitting and receiving signals of first and second predetermined frequencies; a first pair of band rejection filters each normally connected between a respective one of said telephone circuits and said channel for filtering out signals of said first frequency; a pair of means each for normally inhibiting a respective one of said signaling equipment means from transmitting and receiving signals of said second frequency; a second pair of band rejection filters for filtering out signals of both of said first and second frequencies; and means responsive to the transmission of a signal of said first frequency by said transmitting signaling equipment means and the detection of said signal by said receiving signaling equipment means for disconnecting said first pair of band rejection filters from said channel and connecting in their sted respective ones of said second pair of band rejection filters, and for disabling said inhibiting means.

4. A combined telephone-signaling system comprising a communication channel, a pair of telephone circuits, a pair of signaling equipment means for respectively transmitting and receiving a plurality of signals of predetermined frequencies, a first pair of rejection filters each normally connected between a respective one of said telephone circuits and said channel for filtering out subset of signals in said plurality, a first pair of pass filters each normally connected between one of said signaling equipment means and said channel for passing signals in said subset, a second pair of rejection filters for filtering out all signals in said plurality, a second pair of pass filters for passing all signals in said plurality, and means responsive to the transmission of a signal in said subset by said transmitting signaling equipment means and the detection of said signal by said receiving signaling equipment means for disconnecting said first pair of rejection and said first pair of pass filters from said channel and connecting in their sted respective ones of said second pair of rejection and said second pair of pass filters.

5. A communication system comprising a communication channel; a first pair of communicating means each connected to said channel for respectively transmitting and receiving signals in a preselected range of frequencies; a second pair of communicating means each connected to said channel for respectively transmitting and receiving signals of predetermined frequencies in said range; first means for enabling the system to operate in a first mode, said first means including a pair of rejection filters each connected between a repective one of said first communicating means and said channel for filtering out a subset of said signals of predetermined frequencies, and a pair of pass filters each connected between a respective one of said second communicating means and said channel for passing signals in said subset; and second means for enabling the system to operate in a second mode, said second means including a pair of rejection filters each connected between a respective one of said first communicating means and said channel for filtering out all of said signals of predetermined frequencies, and a pair of apss filters each connected between a respective one of said second communicating means and said channel for passing all of said signals of predetermined frequencies.

6. A communication system comprising a communication channel; a first pair of communicating means connected to said channel for respectively transmitting and receiving signals in a preselcted range of frequencies; a second pair of communicating means connected to said channel for respectively transmitting and receiving signals of predetermined frequencies in said range; first means for enabling the system to operate in a first mode, said first means including a pair of means each connected to a respective one of said first communicating means for preventing said first communicating means from respectively transmitting and receiving a subset of said signals of predetermined frequencies, and a pair of means each connected to a respective one of said second communicating means for enabling said second communicating means to respectively transmit and receive only signals in said subset; and second means for enabling the system to operate in a second mode, said second means including a pair of means each connected to a respective one of said first communicating means for preventing said first communicating means from respectively transmitting and receiving all of said signals of predetermined frequencies, and a pair of means each connected to a respective one of said second communicating means for enabling said second communicating means to respectively transmit and receive all of said signals of predetermined frequencies.

7. A communication system in accordance with claim 6 further including means responsive to the absence for a predetermined time interval of the transmission of any of said signals of predetermined frequencies on said channel while the system is operating in said second mode for causing the system to operate in said first mode.

8. A communication system in accordance with claim 6 further including means responsive to the appearance of one of the signals in said subset on said channel while the system is operating in said first mode for causing the system to operate in said second mode.

9. A communication receiver apparatus for connection to a communication channel over which are received signals in a preselected range of frequencies comprising first means connected to said channel for receiving said signals; second means connected to said channel for receiving signals of predetermined frequencies in said range; first means for enabling the apparatus to operate in a first mode, said first means including a rejection filter connected between said first receiving means and said channel for filtering out a subset of said signals of predetermined frequencies and a pass filter connected between said second receiving means and said channel for passing signals in said subset; and second means for enabling the apparatus to operate in a second mode, said second means including a rejection filter connected between said first receiving means and said channel for filtering out all of said signals of predetermined frequencies and a pass filter connected between said second receiving means and said channel for passing all of said signals of predetermined frequencies.

10. A communication transmitter apparatus for connection to a communication channel over which are transmitted signals in a preselected range of frequencies comprising first means connected to said channel for transmitting said signals; second means connected to said channel for transmitting signals of predetermined frequencies in said range; first means for enabling the apparatus to operate in a first mode, said first means including a rejection filter connected between said first transmitting means and said channel for filtering out a subset of said signals of predetermined frequencies and a pass filter connected between said second transmitting means and said channel for passing signals in said subset; and second means for enabling the apparatus to operate in a second mode, said second means including a rejection filter connected between said first transmitting means and said channel for filtering out all of said signals of predetermined frequencies and a pass filter connected between said second transmitting means and said channel for passing all of said signals of predetermined frequencies.

11. A communication receiver apparatus for connection to a communication channel over which are received signals in a preselected range of frequencies comprising first and second receivers connected to said channel for receiving signals; first means for enabling the apparatus to operate in a first mode, said first means including means for preventing said first receiver from responding to a subset of signals in a group of signals of predetermined frequencies and means for enabling said second receiver to respond to signals only in said subset; and second means for enabling the apparatus to operate in a second mode, said second means including means for preventing said first receiver from responding to any of said signals of predetermined frequencies and means for enabling said second receiver to respond to all of said signals of predetermined frequencies.

12. A communication receiver apparatus in accordance with claim 11 further including means responsive to the absence for a predetermined time interval of the receipt of any of said signals of predetermined frequencies on said channel while the apparatus is operating in said second mode for causing the system to operate in said first mode.

13. A communication receiver apparatus in accordance with claim 11 further including means responsive to the receipt of one of the signals in said subset on said channel while the apparatus is operating in said first mode for causing the apparatus to operate in said second mode.

14. A communication transmitter apparatus for connection to a communication channel over which are transmitted signals in a preselected range of frequencies comprising first and second transmitters connected to said channel for transmitting signals; first means for enabling the apparatus to operate in a first mode, said first means including means for preventing said first transmitter from transmitting a subset of signals in a group of signals of predetermined frequencies and means for enabling said second transmitter to transmit only signals in said subset; and second means for enabling the apparatus to operate in a second mode, said second means including means for preventing said first transmitter from transmitting any of said signals of predetermined frequencies and means for enabling said second transmitter to transmit all of said signals of predetermined frequencies.

15. A communication transmitter apparatus in accordance with claim 14 further including means responsive to the absence for a predetermined time interval of the transmisison of any of said signals of predetermined frequencies while the apparatus is operating in said second mode for causing the apparatus to operate in said first mode.

16. A communication transmitter apparatus in accordance with claim 14 further including means responsive to the transmission of one of the signals in said subset while the apparatus is operating in said first mode for causing the apparatus to operate in said second mode.

17. A communication system comprising: a communication channel, a pair of telephone circuits, a corresponding pair of signaling equipment means for respectively transmitting and receiving signals of a set of predetermined frequencies, filter means connected between the one of said pair of telephone circuits corresponding to said transmitting signaling equipment means and said communication channel, said transmitting signaling equipment means comprising first control means for controlling said filter means to selectively reject signals of said set of predetermined frequencies and said receiving signaling equipment means comprising second control means responsive to signals of said set of predetermined frequencies for controlling said receiving signaling equipment means to be selectively responsive to signals of said set of predetermined frequencies.

18. A communication system in accordance with claim 17 wherein said first and said second control means are responsive to signals of said set of predetermined frequencies, said first and said second control means being effective in the absence of signals of said set of predetermined frequencies for selectively controlling said filter means to reject signals of a selected frequency of said set of predetermined frequencies and for limiting the response of said receiving signaling equipment means to signals of said selected frequency, said first and said second control means being responsive to signals of said selected frequency for respectively controlling said filter means to reject all frequencies of said set of predetermined frequencies and for controlling said receiving signaling equipment means to be responsive to all frequencies of said set of predetermined frequencies.

References Cited

UNITED STATES PATENTS 2,364,685 12/1944 Baker ---------------- 179—84

KATHLEEN H. CLAFFY, *Primary Examiner.*

B. P. SMITH, *Assistant Examiner.*

U.S. Cl. X.R.

179—16